United States Patent
Cheung et al.

(10) Patent No.: US 6,845,183 B2
(45) Date of Patent: Jan. 18, 2005

(54) SLOTTED ELECTRODE ELECTRO-OPTIC MODULATOR

(75) Inventors: Siu Kwan Cheung, Storrs, CT (US); Srinath Chakravarthy, Enfield, CT (US); Karl Kissa, Simbury, CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/720,796

(22) Filed: Nov. 24, 2003

(65) Prior Publication Data

US 2004/0151414 A1 Aug. 5, 2004

Related U.S. Application Data

(60) Provisional application No. 60/445,140, filed on Feb. 5, 2003.

(51) Int. Cl.[7] ................ G02F 1/035; G02F 1/295; G02F 1/03; G02F 1/00
(52) U.S. Cl. ............... 385/2; 385/3; 385/8; 359/245; 359/322
(58) Field of Search ................. 359/237, 245, 359/254, 315, 322; 385/1–4, 8, 9, 14, 15, 27, 39, 40, 129–131; 334/45

(56) References Cited

U.S. PATENT DOCUMENTS

| | | | | |
|---|---|---|---|---|
| 4,039,982 A | * | 8/1977 | Weldon | 334/45 |
| 5,214,724 A | | 5/1993 | Seino et al. | 385/2 |
| 6,181,456 B1 | | 1/2001 | McBrien et al. | 359/245 |
| 6,449,080 B1 | | 9/2002 | McBrien et al. | 359/245 |

* cited by examiner

*Primary Examiner*—Georgia Epps
*Assistant Examiner*—Jack Dinh
(74) *Attorney, Agent, or Firm*—Allen, Dyer, Doppelt Milbrath & Gilchrist, P.A.

(57) ABSTRACT

A co-planar waveguide interferometric electro-optic modulator is disclosed. A Z-cut lithium niobate electro-optic substrate includes a first and second waveguide that are formed in the lithium niobate electro-optic substrate. An elongate RF electrode at least partially covers one of the waveguides. A slotted electrode is disclosed formed by two elongate substantially-parallel electrodes one of which is at least partially covers the other of the waveguides. At least one electrode is substantially greater, preferably at least twice the width of the elongate RF electrode.

11 Claims, 9 Drawing Sheets

Invention Cross-Section View
Double-Slot Design

W_g must be greater than or equal to 2X W_hot for low RF loss
Double-slot insures electrical symmetry about hot electrode

SLOTTED ELECTRODE ELECTRO-OPTIC MODULATOR

CROSS-REFERENCE TO RELATED APPLICATIONS

The present invention claims priority from U.S. patent application No. 60/445,140 filed Feb. 5, 2003, entitled "High-Speed Bias-Stable Modulator", which is incorporated herein by reference for all purposes.

FIELD OF THE INVENTION

The present invention relates to improvements in electro-optic modulators. In particular, the present invention relates to methods and apparatus for reducing bias point sensitivity to ambient temperature and an applied RF signal in an electro-optic modulator while ensuring adequate high-speed performance.

BACKGROUND OF THE INVENTION

Figure 1:
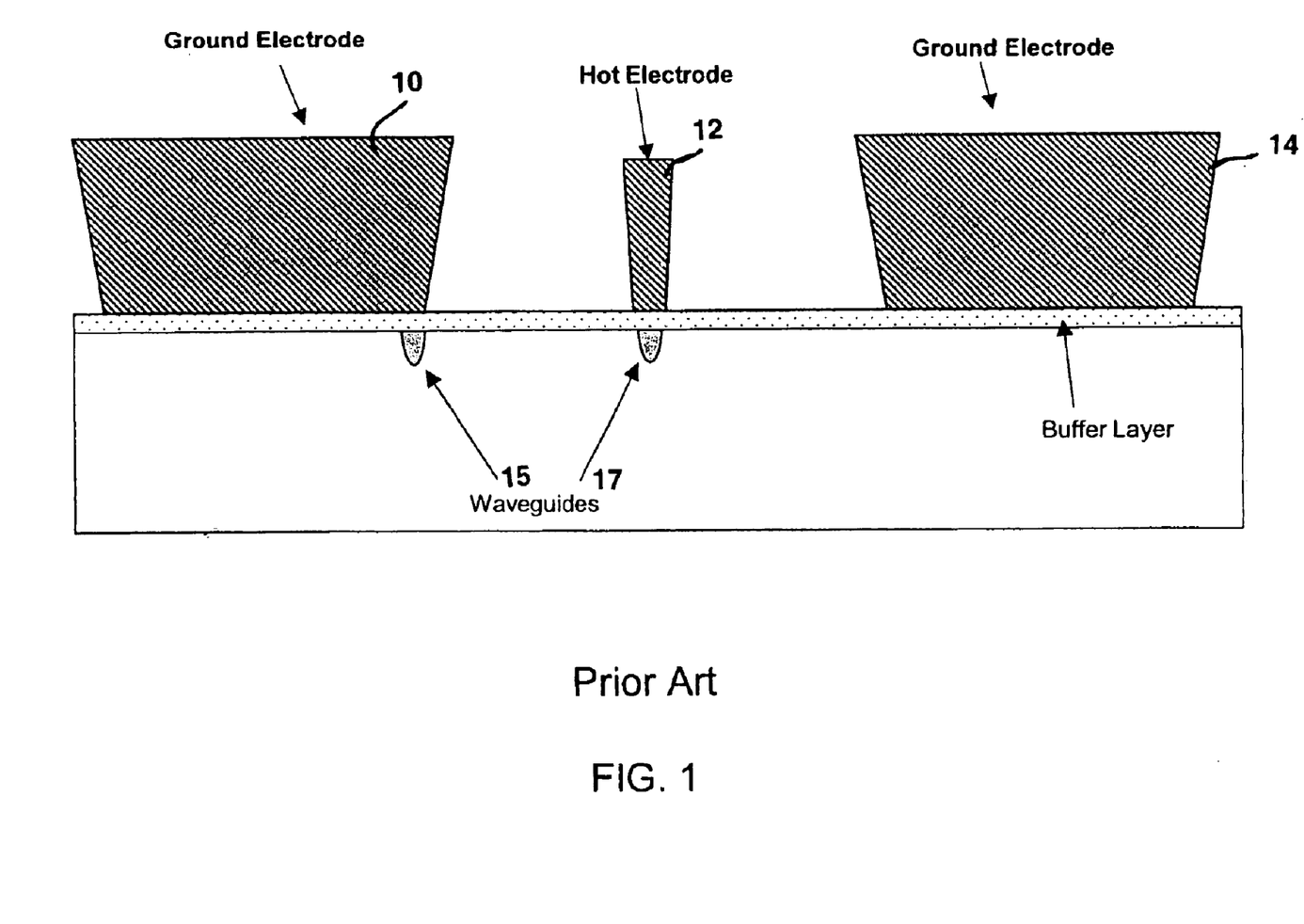
FIG. 1 is a cross-sectional view of a prior art interferometer type modulator having three coplanar strip electrodes driven by a single drive voltage.

Referring now to FIG. 1, a portion of a Mach Zehnder interferometer type modulator, with three coplanar strip electrodes 10, 12 and 14 is shown, having only a single drive voltage. This externally modulated system has a Z-cut $LiNbO_3$ substrate, which requires a lower drive voltage than is generally required for X-axis or X-cut crystal orientation. The Z-cut $LiNbO_3$ substrate has an electro-optical effect, which provides a broadband low drive voltage modulator. The electrodes are shown to be disposed over waveguides 15 and 17.

Electro-optic modulators are typically biased with a DC voltage to set the quiescent phase difference between the two optical paths and to establish the operating point on the intensity-voltage curve about which modulation is induced. The bias point of electro-optic modulators is a function of the ambient temperature and the applied RF signal. As the ambient temperature and the applied RF signal changes, the desired bias point changes. The sensitivity of the bias point to ambient temperature and to the applied RF signal can cause an increase in the bit error rate in digital communication systems. Conventional single-drive Z-cut modulators are known to exhibit a large bias shift with temperature change, potentially reducing the useable lifetime of the modulator, if the bias voltage approaches or reaches a voltage "rail" or limit.

X-cut lithium niobate modulators with Asymmetric Co-Planar Waveguide (ACPW) electrodes, and single-drive z-cut modulators with symmetric Co-Planar Waveguide (CPW) electrodes, have particularly strong bias point sensitivity to temperature. The bias point sensitivity results from a mismatch in thermal-expansion coefficients between the metal forming the electrodes, which is typically gold, and the electro-optic substrate, which is lithium niobate for Z-cut modulators. The mismatch results in thermal stress in the substrate that is localized near the bottom of the electrodes. Some components of this stress are significant near the corners of the electrodes, while other components are significant directly underneath the middle of the electrode. The relative importance of these stress components depends on the crystal cut. This "thermal stress" is a mechanical stress that is a function of temperature. The thermal stress generates an unwanted piezoelectric voltage that is experienced by the waveguides.

In conventional Z-cut modulators, a relatively wide ground electrode is required, which causes significantly more thermal stress than the RF or hot electrode, because there is more strain accumulated across the width of the ground electrode thereby generating a higher piezoelectric voltage compared with the RF electrode. The difference in the piezoelectric voltages experienced by waveguides results in a significant phase change that shifts the bias point of the modulator as ambient temperature is increased.

These modulators also have bias point sensitivity to the applied RF because of the "skin-effect." The RF electrode is significantly smaller in cross section than the ground electrode and therefore introduces more RF attenuation than the ground electrode. The lost RF energy is dissipated as heat, which causes a rise in temperature in the waveguides. Since the wider ground electrode is a more effective heat sink than the RF electrode, a temperature differential may occur between the waveguides. The temperature differential shifts the bias point because the waveguides experience different magnitudes of thermal stress and because the optical refractive index of the substrate changes as a function of temperature.

Some prior art electro-optic modulator designs use electrode structures that reduce bias point sensitivity to the applied RF signal. For example, U.S. Pat. No. 6,449,080 incorporated herein by reference, in the name of Kissa et al. issued Sep. 10, 2002 and assigned to JDS Uniphase Corporation, having common inventorship and ownership with this instant invention, discloses a slotted electrode design which mitigates some of the problems described heretofore, with X-cut electrodes.

It is an object of this invention to provide a different solution, which significantly reduces bias drift over temperature, more especially for Z-cut electrodes, but not limited thereto.

There is yet another aspect which an embodiment of this invention addresses:

In prior art modulators, DC voltages are sometimes combined with RF voltages by use of a "bias Tee", and applied to the RF hot electrode together. The DC voltage is utilized to steer the quiescent operating point of the modulator in a desired manner. Unfortunately, the "bias Tee" can introduce RF signal loss at high frequencies, especially for 40 Gb/sec modulation rates. It is therefore sometimes desirable to be able to steer the operating point of the modulator, without the use of a "bias Tee". For example U.S. Pat. No. 5,214,724 in the names of Seino et al. issued May 25, 1993 and assigned to Fujitsu Limited, teaches that the bias point can be steered with use of a third electrode. At DC voltage this third electrode operates similar to a ground electrode. Notwithstanding, the '724 patent does not teach a solution for integrating this third electrode into a ground electrode suitable for operating at high RF frequencies.

It is an object of an embodiment of this invention to provide such a solution by use of capacitive bridging between slotted ground electrodes.

SUMMARY OF THE INVENTION

In accordance with an aspect of this invention, there is provided, a co-planar waveguide interferometric electro-optic modulator comprising:
a) a first and second waveguide that are formed in an electro-optic substrate; and,
b) a plurality of electrodes including an RF electrode having a width $W_{RF}$ and a slotted ground electrode including first and second elongate electrically connected conductive portions having widths $W_F$ and $W_S$ respectively, wherein the first elongate conductive portion is disposed between the RF electrode and the second elongate conductive portion, and wherein $W_F$ is at least 20% greater than $W_{RF}$, the RF electrode positioned over the electro-optic substrate between one of first and the second waveguides or at least partially over one of the first and second waveguides; the overall width of slotted ground electrode having a width substantially greater than the width of the RF electrode and dimensioned to reduce a piezoelectric voltage caused by thermal stress, thereby reducing a net phase shift and a resulting bias point sensitivity of the modulator to ambient temperature.

In another aspect of the invention there is provided, a co-planar waveguide interferometric electro-optic modulator comprising: a Z-cut lithium niobate electro-optic substrate; a first and second waveguide that are formed in the Z-cut lithium niobate electro-optic substrate; an elongate RF electrode at least partially covering one of the first and second waveguides along its length; and, a slotted electrode formed by two elongate substantially parallel electrodes, at least one of which is at least partially covering the other of the first and second waveguides, said at least one electrode being substantially greater in width than the elongate RF electrode, wherein the two elongate substantially parallel electrodes having a gap therebetween defining a slot that is less than a gap between the at least one electrode and the RF electrode.

BRIEF DESCRIPTION OF THE DRAWINGS

Exemplary embodiments of the invention will now be described in conjunction with the drawings in which.

DETAILED DESCRIPTION

Figure 4:
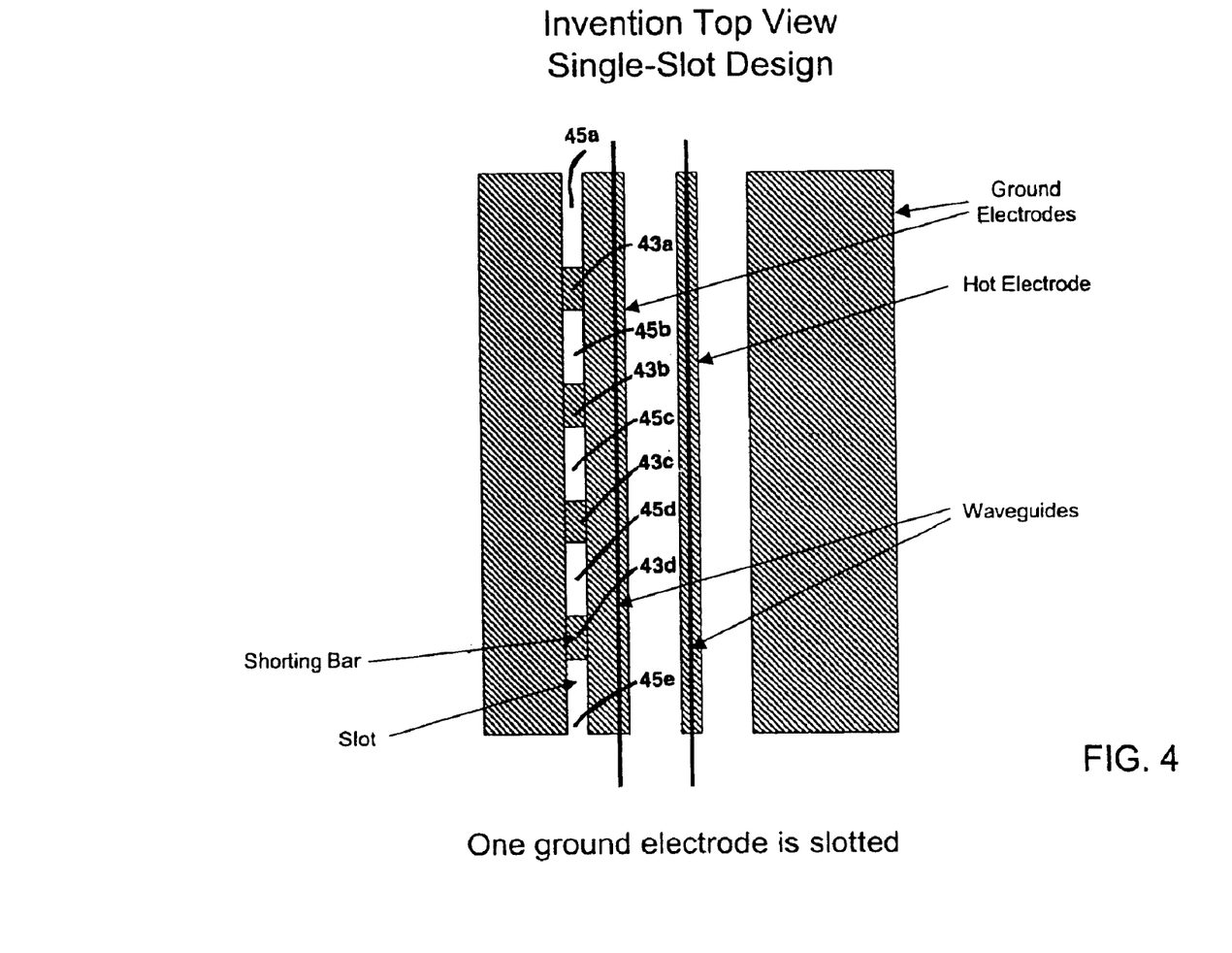
FIG. 4 is a top view of the electro-optic modulator shown in FIG. 3.
Figure 6:
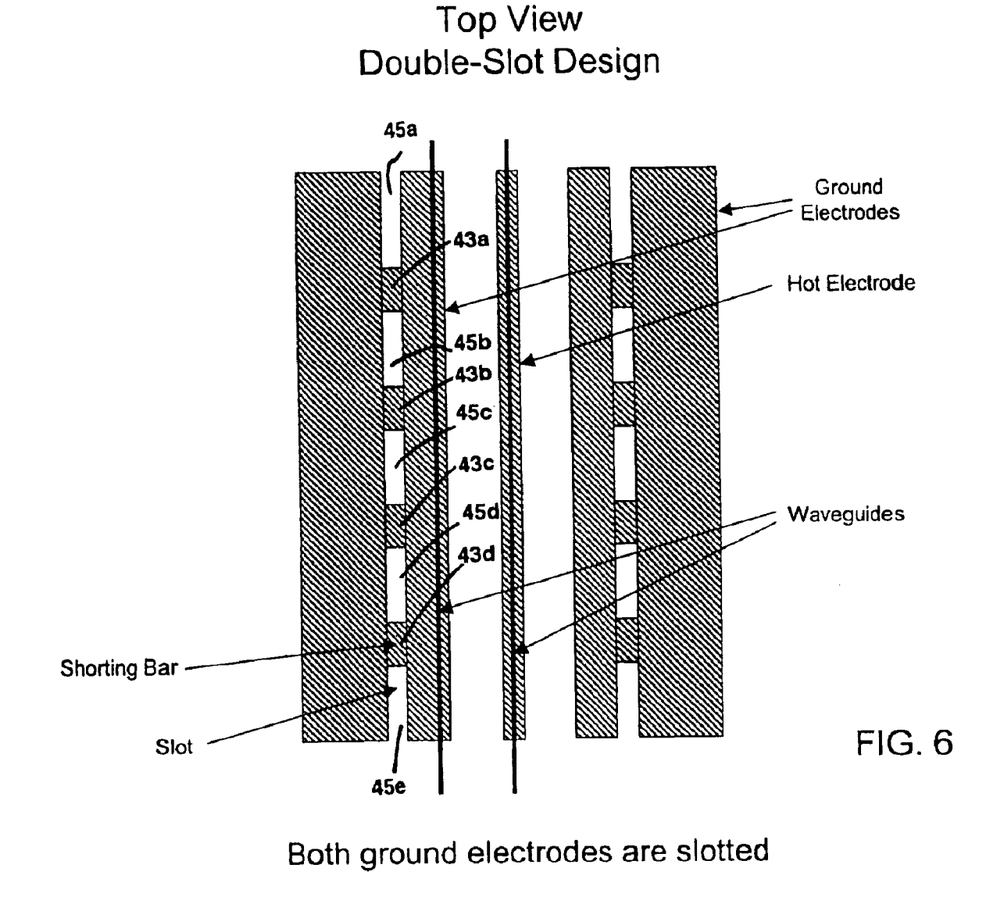
FIG. 6 is a top view of the modulator shown in FIG. 5.

The term slotted electrode is used throughout this specification and has a meaning, which includes, two elongate conductors having a slot therebetween. The slots may vary in size or may be uniform. In a preferred embodiment of this invention the two elongate conductors are bridged by spanning conductors or shorting bars 43a, 43b, 43c, and 43d as shown in FIG. 4, at predetermined intervals, whereby slots 45a through 45e absent of conductive material are defined bounded by the shorting bars and the elongate conductors as shown in FIGS. 4 and 6. In this particular preferred embodiment 5 slots are shown of equal dimension, the outermost slots being bounded on three sides by conductive material. In another embodiment, there are shorting bars at the ends of the conductors, in which case the outermost slots are bounded on four sides by conductive material. In most embodiments, there are additional electrode traces connecting the ends of the coplanar strip electrodes to square or rectangular "bond pads", to which wires are wire-bonded, providing connection to some type of electrical interface. The ground electrodes of these additional electrode traces need not be slotted, as they do not traverse along the waveguides for any appreciable length.

Referring now to FIGS. 3 through 6, embodiments of high-speed lithium niobate Z-cut electro-optic modulators incorporating a Mach-Zehnder Interferometer (MZI), are shown, having a bias point substantially insensitive to temperature changes under normal operating conditions.

Figure 2:
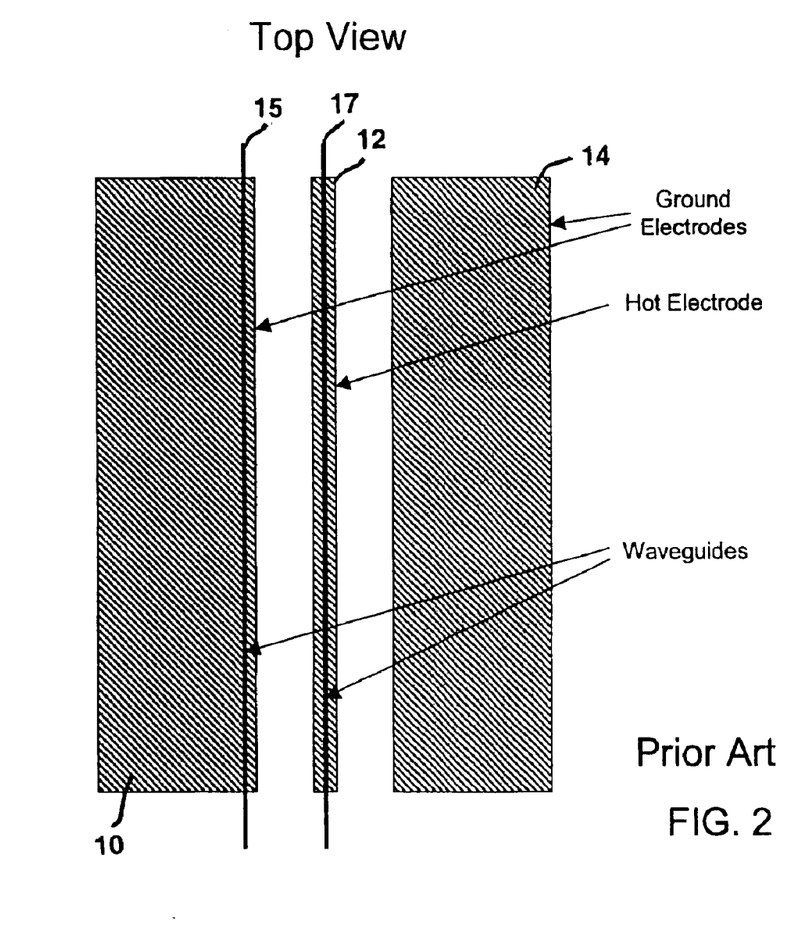
FIG. 2 is a top view of the prior art interferometer shown in FIG. 1.
Figure 3:
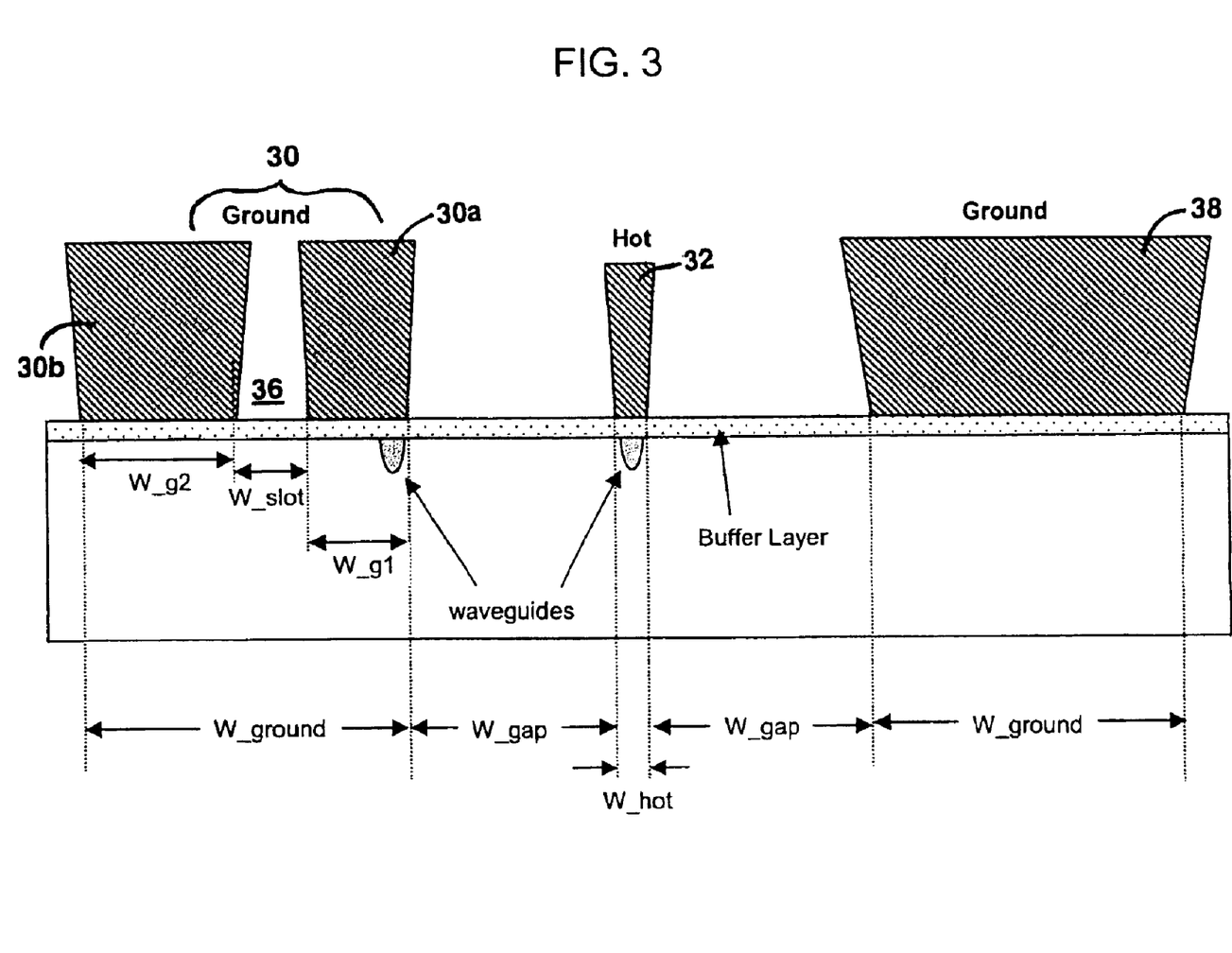
FIG. 3 is a cross-sectional view of a Z-cut lithium-niobate electro-optic modulator having a single slotted ground electrode in accordance with an embodiment of the invention.

In accordance with this invention, the wide electrodes 10 and 14, shown in the prior art FIGS. 1 and 2 are substituted with slotted electrodes 30 shown in FIG. 3 reducing stress change over temperature. Rather than attempting to exactly balance the stresses over temperature, the invention reduces the stress change over temperature in the wide electrode(s), which are typically ground electrode(s), as the stress change is related to physical width. The electrode thermal expansion is generally mismatched from the substrate and any intervening buffer layer. The amount of stress change increases with width of the electrode, since the thermal expansion induced stress is cumulative over the width of a structure. The stress and therefore stress change over temperature is typically small near the hot electrode, due to its narrow width. The ground electrode, however, is typically at least 10 times wider than the hot electrode, in order to minimize conduction loss at high frequency. Transmission of high frequency signals by the conductors are necessary if high speed operation is to be achieved. The width mismatch between the hot and ground conductors is the primary cause for the stress differential that occurs over temperature, as experienced by the waveguides underneath.

Although the prior art suggests techniques for balancing the stress or reducing it, it does not provide an adequate solution while maintaining the high-speed electrical performance of the conductors. The modulator shown in FIG. 3 adequately suppresses stress-induced bias shift, and simultaneously maintains adequate high-speed electrical performance of the electrode.

In a preferred embodiment shown in FIG. 3 the width $W\_g1$ of the narrow section of the ground electrode 30a, is at least twice the width $W\_hot$ of the hot electrode 32 referred to also as the RF electrode. Notwithstanding some improvement was noted with the ground electrode 30a even 20% greater than the width of the hot electrode 32.

Figure 5:
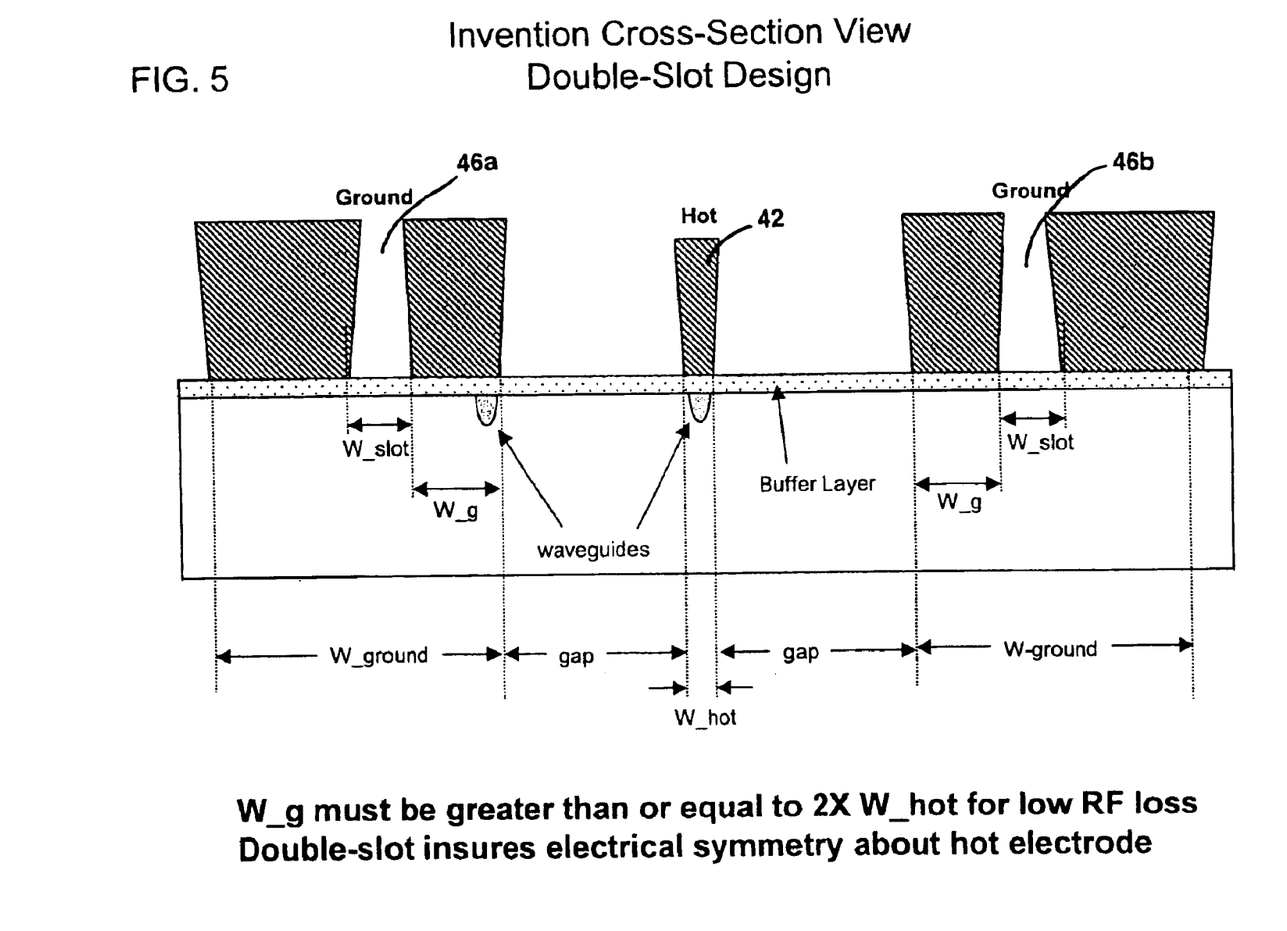
FIG. 5 is a cross-sectional view of a Z-cut lithium-niobate double-slot electro-optic modulator in accordance with an embodiment of the invention.

Although the modulator shown in FIGS. 3 and 4 having a single slot 36 performs well, advantageously, two slots 46a and 46b as shown in FIGS. 5 and 6 are provided.

The two slots 46a and 46b insure that the conductor geometry is symmetric about the hot electrode 42. It should be noted that the slot 46a is effectively divided up into smaller slots by the inclusion of the shorting bars 43a through 43d thereby defining slots 45a through 45e. This is the same for the right slotted electrode where the slot 46b is sub-divided into further slots by the inclusion of the shorting bars. The single-slot configuration of FIG. 3 is slightly asymmetric, since the left ground elongate conductor 30 is slotted while the right ground conductor 38 is not. This asymmetry can cause the electromagnetic wave to shift slightly off center, reducing the electro-optic modulation experienced by the waveguide underneath the hot electrode. The provision of a double-slot 46a, 46b in FIG. 5 insures electrical symmetry about the hot electrode 32, eliminating the possibility of any lateral shift of the electromagnetic wave traveling along the electrodes.

The width of the slot 32 can vary and typically has a value of between W_hot and W_gap. If the selected slot dimension is too narrow, the stress created by the wide section of the ground electrode 30b, having width W_g2, will begin to induce a bias shift in the waveguide under the ground electrode. If the slot is too wide, the net conductor loss for the ground electrode may become exceedingly large at high frequencies. Keeping the slot width between W_hot and W_gap mechanically decouples the two sections 30a and 30b of the slotted ground electrode, reducing stress changes over temperature, while maintaining adequate electrical coupling, a requirement for low net conductor loss at high frequencies. Therefore, the modulator of this invention is capable of operating at a high speed ensuring that the drift bias point is adequately suppressed.

In the previous embodiments shown, the two ground electrodes are preferably electrically coupled by bridging conductors 43a, 43b, 43c and 43d, which serve as shorting bars. However in the present embodiment shown in FIG. 7 bridging conductors are absent and integrated interdigitated capacitor (IIC) structures 72a and 72b are shown. In this instance capacitive coupling occurs between the first and second ground conductors 76a and 78a, which may reduce the need for bridging conductors. Capacitive coupling also occurs between the ground conductors 76b and 78b, which may reduce the need for bridging conductors.

Figure 7:
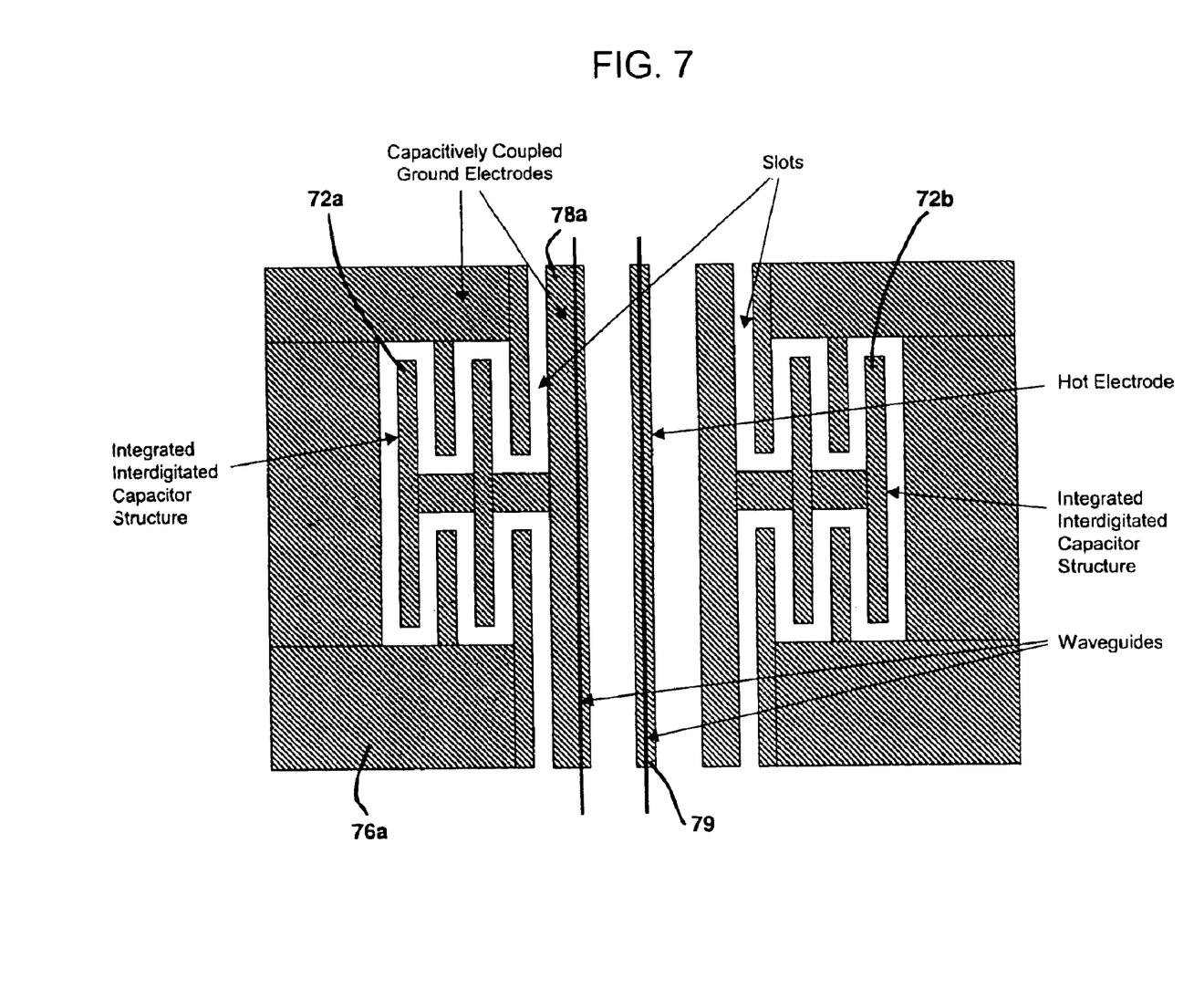
FIG. 7, FIG. 8, and FIG. 9, are top views of modulators having interdigitated capacitive coupling in accordance with embodiments of the invention.

The capacitive bridging shorts the two sections 76a and 78a of the ground electrode together at high frequency, yet allows the narrower section 78a to float at DC frequencies. As the ground electrodes effectively shorted at high frequencies this prevents any anomalous microwave behavior from occurring. If the voltage potentials on the ground electrode sections were to be different at high frequency, this would allow higher order microwave modes to arise, leading to larger RF signal loss and large ripple in the RF loss vs. frequency curve. The isolation at DC allows different DC voltage potentials to be applied to the two sections of ground electrode. The different DC voltages create an applied DC electric field to the waveguide underneath the narrow ground section 78a, making it possible to steer the quiescent operating point of the modulator. In yet another embodiment, the narrow ground section 78a could carry a DC current, creating local heating. The local heating would change the index of refraction in the waveguide underneath the narrow ground section, causing the operating point to shift. The operating point could be steered with DC current, as is taught in U.S. Pat. No. 6,181,456 assigned to JDS Uniphase.

Figure 8:
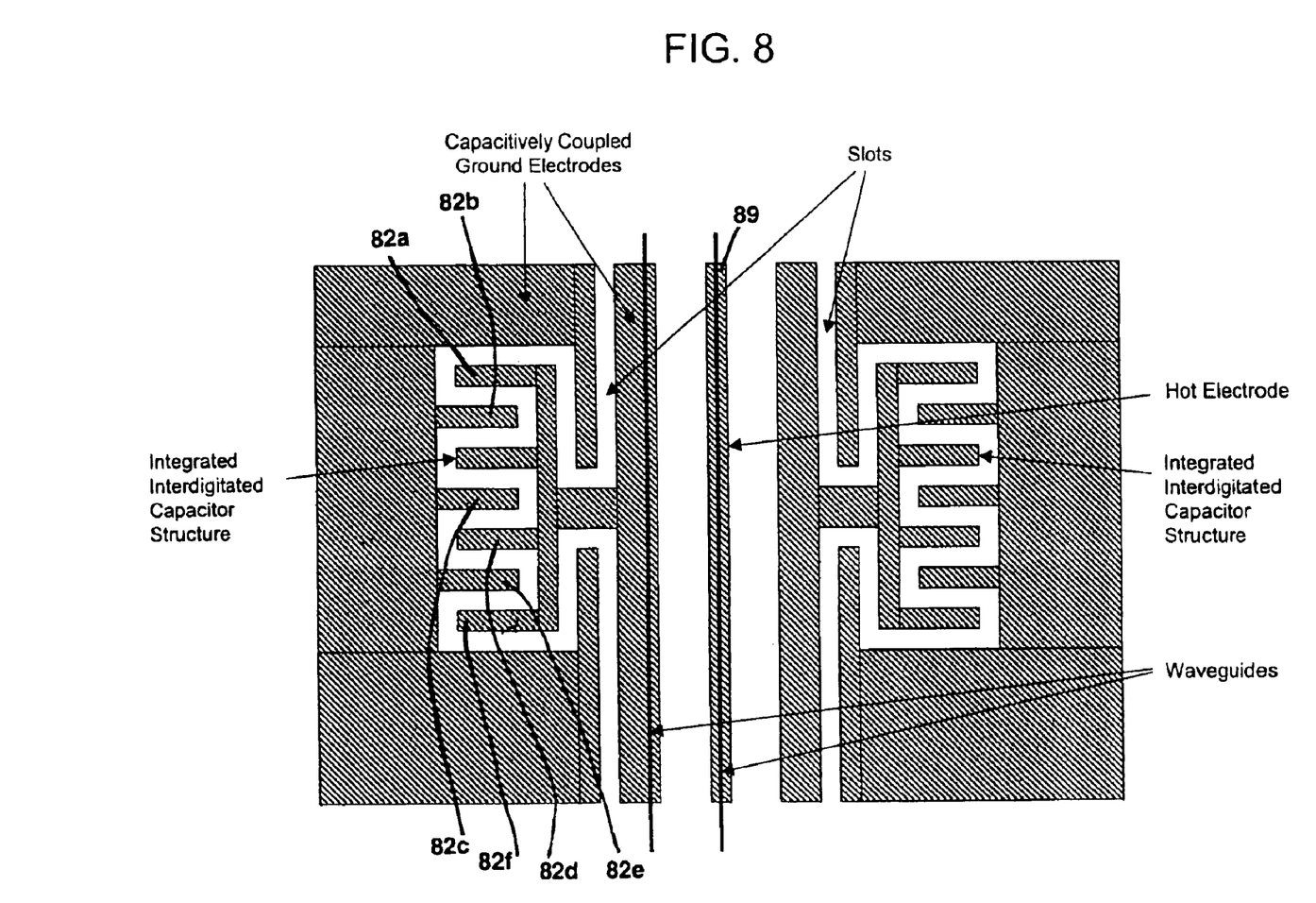
Figure 9:
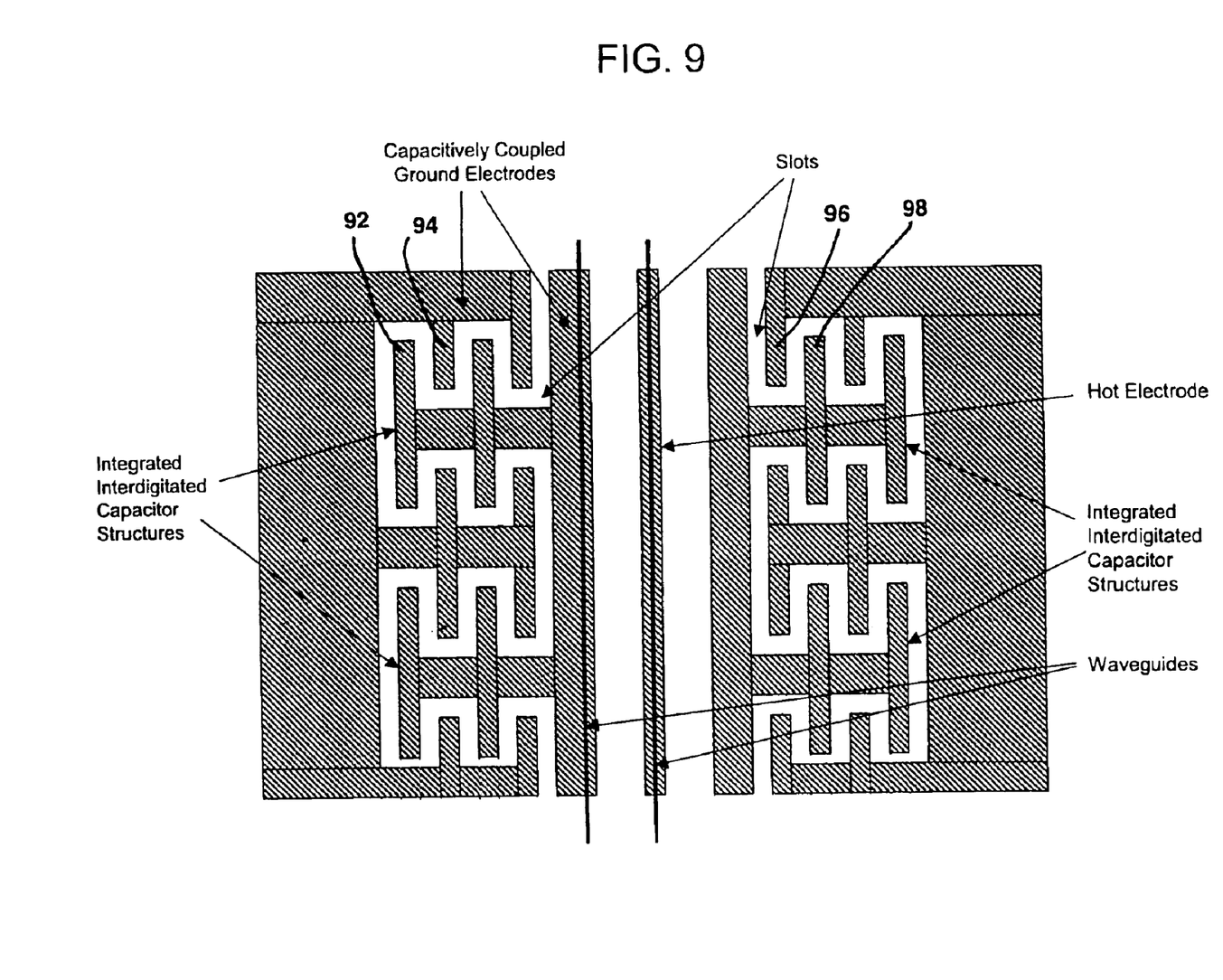

In FIG. 7, the long bars of the interdigitated capacitor are predominantly parallel to the RF hot electrode 79. In FIG. 8, the long bars 82a through 82f are predominantly perpendicular to the RF hot electrode 89. The modulator shown in FIG. 9 is similar to that of FIG. 7, except that the interdigitated capacitors 92, 94, 96, and 98 are closely spaced to each other down the length of the electrode. The closer spacing increases the amount of capacitive coupling, but also results in some stress reduction in the wider portion of the ground electrode, as the ground electrode behaves mechanically like a ground electrode with multiple slots. The increased amount of capacitive coupling may also allow for a larger gap between the narrow and wide ground sections, which prevents stress from the wide section from reaching the waveguide under the narrow section. However, one drawback of the modulator shown in FIG. 9, as any structure with multiple slots, is the greater chance for fabrication defects to occur.

Of course, numerous other embodiments may be envisaged without departing from the spirit and scope of the invention.

What is claimed is:

1. A waveguide interferometric electro-optic modulator comprising:
   a) first and second waveguides formed in an electro-optic substrate; and,
   b) a plurality of electrodes including: an RF electrode having a width $W_{RF}$; and a slotted ground electrode including first and second elongate electrically-connected conductive portions having widths $W_F$ and $W_S$, respectively defining a slot therebetween;
   wherein the first elongate conductive portion is disposed between the RF electrode and the second elongate conductive portion,
   wherein $W_F$ is at least 20% greater than $W_{RF}$,
   wherein the RF electrode is positioned over the electro-optic substrate between the first and the second waveguides or at least partially over one of the first and second waveguides; and
   wherein the slotted ground electrode has an overall width substantially greater than the width of the RE electrode and dimensioned to reduce a piezoelectric voltage caused by thermal stress, thereby reducing a net phase shift and a resulting bias point sensitivity of the modulator to ambient temperature.

2. A waveguide interferometric electro-optic modulator as defined in claim 1, wherein the first and second waveguides are coplanar, and wherein the slotted ground electrode is disposed over the other, of the first and second waveguides or between the first and second waveguides, the slot for reducing strain accumulated across the width of the slotted ground electrode.

3. A waveguide interferometric electro-optic modulator as defined in claim 2, wherein the width of the first elongate portion of the slotted ground electrode is at least twice the width of the RF electrode along at least a substantial part of their lengths.

4. A waveguide interferometric electro-optic modulator as defined in claim 2, wherein the slotted ground electrode is patterned on the electro-optic substrate.

5. A co-planar waveguide interferometric electro-optic modulator as defined in claim 4, wherein the two elongate electrodes each have interdigitated members forming a large capacitor structure for providing capacitive coupling at high frequencies.

6. A waveguide interferometric electro-optic modulator as defined in claim 2, wherein the slotted ground electrode is formed of a first elongate electrode and a second elongate parallel electrode; and wherein a plurality of conductive bridges electrically couple the first and second elongate portions.

7. A coplanar waveguide interferometric electro-optic modulator as defined in claim 2, wherein the slotted ground electrode has interdigitated members forming a large capacitor structure for providing capacitive coupling at high frequencies.

8. A coplanar waveguide interferometric electro-optic modulator as defined in claim 7, further comprising a second slotted ground electrode.

9. A coplanar waveguide interferometric electro-optic modulator as defined in claim 7, wherein one or more of interdigitated members are perpendicular to the RF electrode.

10. A coplanar waveguide interferometric electro-optic modulator as defined in claim 2, further comprising a second ground electrode.

11. A waveguide interferometric electro-optic modulator as defined in claim 1, wherein the electro-optic substrate is a Z-cut lithium niobate substrate.

* * * * *